(12) United States Patent
Chi et al.

(10) Patent No.: US 11,867,960 B2
(45) Date of Patent: Jan. 9, 2024

(54) OPTICAL MODULE

(71) Applicant: HISENSE BROADBAND MULTIMEDIA TECHNOLOGIES CO., LTD., Shandong (CN)

(72) Inventors: Yaxun Chi, Shandong (CN); Nan Xue, Shandong (CN); Xuzhen Tao, Shandong (CN); Peng Yang, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/549,797

(22) Filed: Dec. 13, 2021

(65) Prior Publication Data

US 2022/0107477 A1    Apr. 7, 2022

Related U.S. Application Data

(63) Continuation of application No. PCT/CN2021/089077, filed on Apr. 22, 2021.

(30) Foreign Application Priority Data

Aug. 28, 2020   (CN) .......................... 202021839839.1

(51) Int. Cl.
*G02B 6/42* (2006.01)

(52) U.S. Cl.
CPC ......... *G02B 6/4277* (2013.01); *G02B 6/4256* (2013.01); *G02B 6/4284* (2013.01); *G02B 6/4292* (2013.01)

(58) Field of Classification Search
CPC ................................ G02B 6/42; G02B 6/4277
See application file for complete search history.

(56) References Cited

U.S. PATENT DOCUMENTS 9,423,579 B2   8/2016  Koutrokois
9,989,717 B2   6/2018  Koutrokois
(Continued)

FOREIGN PATENT DOCUMENTS

CN    105164560 A    12/2015
CN    107479152 A    12/2017
(Continued)

*Primary Examiner* — Tina M Wong
(74) *Attorney, Agent, or Firm* — Harness, Dickey & Pierce, P.L.C.

(57) ABSTRACT

The present disclosure provides an optical module, including: an upper shell including an upper optical-port part, where a first fixing groove is disposed on top of the upper optical-port part; a lower shell including a lower optical-port part, where the lower optical-port part fits and is connected to the upper optical-port part, and a second fixing groove is disposed on top of the lower optical-port part; and an optical-fiber connector with one side clamped in the first fixing groove and the other side clamped in the second fixing groove; where a first shielding strip is disposed on a junction of the upper optical-port part and the lower optical-port part, and extends in multiple directions. In the optical module provided in the present disclosure, electromagnetic shielding is implemented at an optical port of the optical module in multiple directions, thereby improving an electromagnetic shielding effect of the optical module.

9 Claims, 7 Drawing Sheets

(56) References Cited

U.S. PATENT DOCUMENTS

| | | |
|---|---|---|
| 10,545,302 B2 | 1/2020 | Koutrokois |
| 10,802,231 B2 | 10/2020 | Koutrokois |
| 2014/0254993 A1 | 9/2014 | Koutrokois |
| 2014/0286613 A1 | 9/2014 | Ito et al. |
| 2016/0266340 A1 | 9/2016 | Zhang et al. |
| 2017/0131493 A1 | 5/2017 | Koutrokois |
| 2019/0018207 A1 | 1/2019 | Koutrokois |
| 2020/0057217 A1 | 2/2020 | Koutrokois |
| 2020/0341219 A1* | 10/2020 | Zhou .................... G02B 6/4292 |

FOREIGN PATENT DOCUMENTS

| | | |
|---|---|---|
| CN | 107567593 A | 1/2018 |
| CN | 108061948 A | 5/2018 |
| CN | 211348749 U | 8/2020 |
| CN | 212647093 U | 3/2021 |

* cited by examiner

OPTICAL MODULE

The present disclosure is a continuation application of PCT international patent application No. PCT/CN2021/089077 filed with the National Intellectual Property Administration on Apr. 22, 2021, claiming priority to Chinese Patent Application No. 202021839839.1, filed with China National Intellectual Property Administration on Aug. 28, 2020 and entitled "OPTICAL MODULE", which is incorporated herein by reference in its entirety.

TECHNICAL FIELD

The present disclosure relates to a field of optical communication technologies, and in particular, to an optical module.

BACKGROUND

In new service and application modes such as cloud computing, mobile Internet, video, and the like, optical communication technologies are used. An optical module implements an optical-to-electrical conversion function in the field of optical communication technologies, which is one of the key components in optical communication equipment. To implement optical-to-electrical and electrical-to-optical conversion functions of the optical module, the optical module includes many electronic components and optical components.

During operation, the electronic components of the optical module may generate electromagnetic waves. Electromagnetic waves dissipating out of the optical module may cause electromagnetic interference (EMI) to other electronic instruments or equipment. EMI may interfere with normal operation of electronic instruments or equipment, and interfere with transmission and reception of signals, resulting in information errors, control failures, and the like. Therefore, to prevent EMI of the optical module from harming other equipment or components, there is a need that a good electromagnetic shielding effect may be achieved from a structure of the optical module, to prevent electromagnetic waves generated by electronic components in the optical module from diffracting out of the optical module and causing EMI to other equipment outside the optical module.

SUMMARY

The present disclosure provides an optical module, including: an upper shell including an upper optical-port part, where a first fixing groove is disposed on top of the upper optical-port part; a lower shell including a lower optical-port part, where the lower optical-port part fits and is connected to the upper optical-port part, and a second fixing groove is disposed on top of the lower optical-port part; and an optical-fiber connector, by one side thereof clamped in the first fixing groove and by the other side thereof clamped in the second fixing groove; where a first shielding strip is disposed on a junction of the upper optical-port part and the lower optical-port part, and extends in multiple directions.

BRIEF DESCRIPTION OF DRAWINGS

To describe the technical solutions in the embodiments of the present disclosure to be clearer, the accompanying drawings required for description of the embodiments or existing technologies are briefly described below. Apparently, the drawings as described below illustrate merely some of embodiments of the present disclosure, and from these accompanying drawings, other drawings may also be derived without creative efforts by a person skilled in the art.

DETAILED DESCRIPTION OF THE EMBODIMENTS

Figure 1:
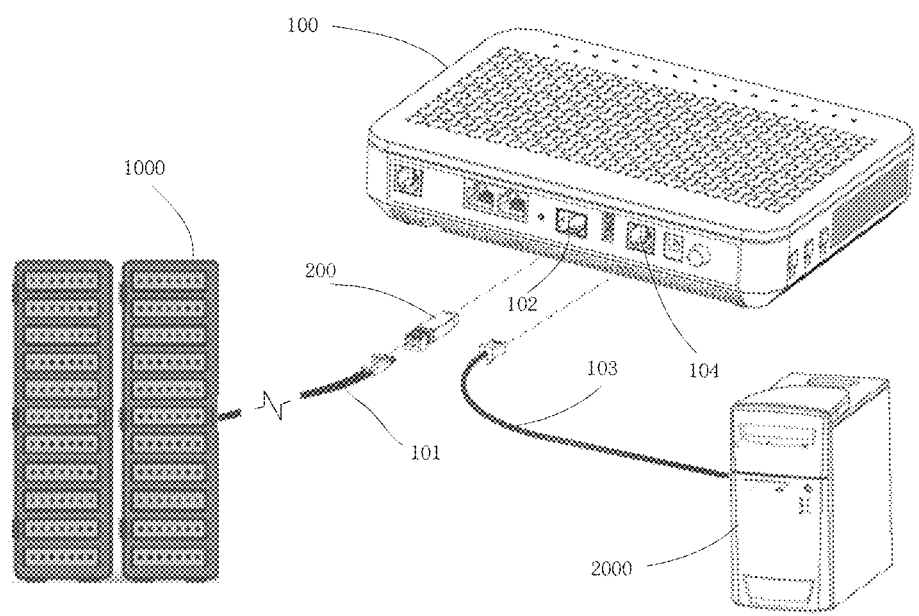
FIG. 1 is a connection relationship diagram of an optical communication system, in accordance with some embodiments I.

The technical solutions according to the embodiments of the present disclosure will be described to be clear and complete with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms used in the present application are used merely for describing specific embodiments, instead of limiting the present application. The singular forms "a(n)" and "the" used in the present application and the appended claims also include plural forms, unless it is clearly specified in the context that other meanings are denoted. It should be further understood that the term "and/or" used herein refers to and includes any or all possible combinations of one or more associated listed items.

Some specific implementations of the present disclosure are described below in detail with reference to the accompanying drawings. The following embodiments and the features in the embodiments may be in combination with one another in the absence of confliction.

One of the core parts of optical fiber communication is an inter-conversion between optical and electrical signals. In the optical fiber communication, an optical signal carrying information is transmitted in an information transmission device such as an optical fiber/optical waveguide, and information transmission with low-cost and low-loss can be achieved based on a passive transmission characteristic of optical signal in the optical fiber/optical waveguide. However, an information processing device such as a computer uses an electrical signal. To establish an information connection between the information transmission device such as the optical fiber/optical waveguide and the information processing device such as the computer, the inter-conversion between the electrical signal and the optical signal is needed.

In the field of optical fiber communication technologies, the above-mentioned function of the inter-conversion between optical and electrical signals is implemented by an optical module, which is a core function of the optical module. The optical module implements an electrical connection to an external master monitor by using a connecting finger on its internal circuit board. Main electrical connections are used for, including, supplies of power, I2C signal and data signal, grounding, and the like. The optical module implements an optical connection to an external optical fiber through an optical interface. A plurality of ways may be used for connection to an external optical fiber, leading to a plurality of types of optical-fiber connectors. It has become a mainstream connection method in the optical module industry to use a connecting finger at an electrical interface to implement an electrical connection. Based on this, a plurality of industry protocols/standards have been formed for definition of a pin on the connecting finger. An optical connection method implemented by using an optical interface and an optical-fiber connector has become a mainstream connection method in the optical module industry. Based on this, a plurality of industry standards, such as an LC interface, an SC interface and an MPO interface are also formed for the optical-fiber connector, and the optical interface of the optical module is also designed to have an adaptive structure for the optical-fiber connector. Therefore, an optical fiber adapter disposed at the optical interface has a plurality of types.

FIG. 1 is a connection relationship diagram of an optical communication system. As shown in FIG. 1, the optical communication system includes a remote server 1000, a local information processing device 2000, an optical network terminal 100, an optical module 200, an optical fiber 101 and a network cable 103.

The optical fiber 101 at one end thereof is connected to the remote server 1000, and at the other end thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

The network cable 103 at one end thereof is connected to the local information processing device 2000, and at the other end thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completed by the optical fiber 101 and the network cable 103, and connection between the optical fiber 101 and the network cable 103 is completed by the optical module 200 and the optical network terminal 100.

The optical module 200 includes an optical port and an electrical port. The optical port is configured to access the optical fiber 101, so that the optical module 200 and the optical fiber 101 establish bidirectional optical signal connection; and the electrical port is configured to access the optical network terminal 100, so that the optical module 200 and the optical network terminal 100 establish bidirectional electrical signal connection. Interconversion between the optical signal and the electrical signal is achieved by the optical module 200, so that a connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that the bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
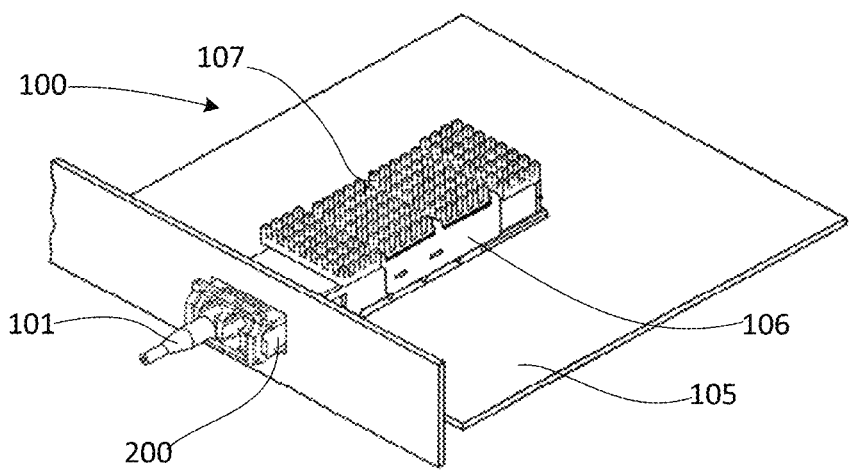
FIG. 2 is a structural diagram of an optical network terminal, in accordance with some embodiments

FIG. 2 is a structural diagram of an optical network terminal. In order to clearly show a connection relationship between the optical module 200 and the optical network terminal 100, FIG. 2 shows only a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector in the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
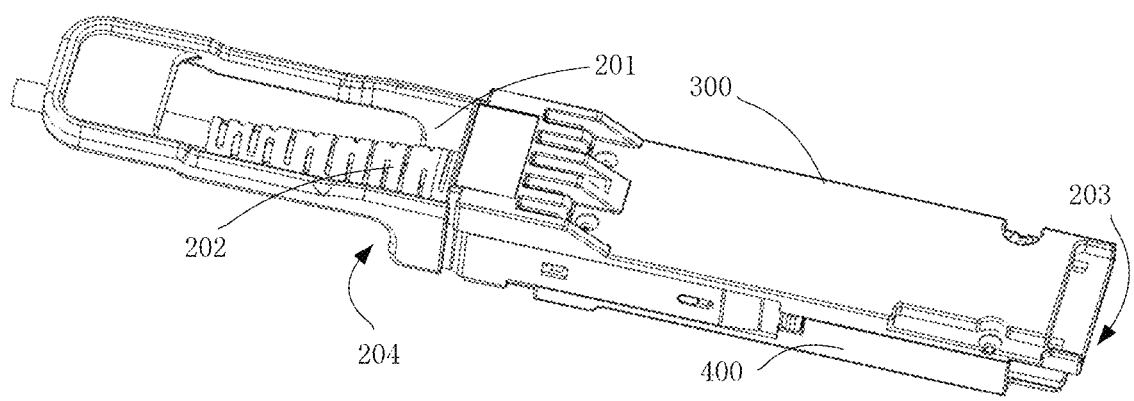
FIG. 3 is a structural diagram of an optical module, in accordance with some embodiments.
Figure 4:
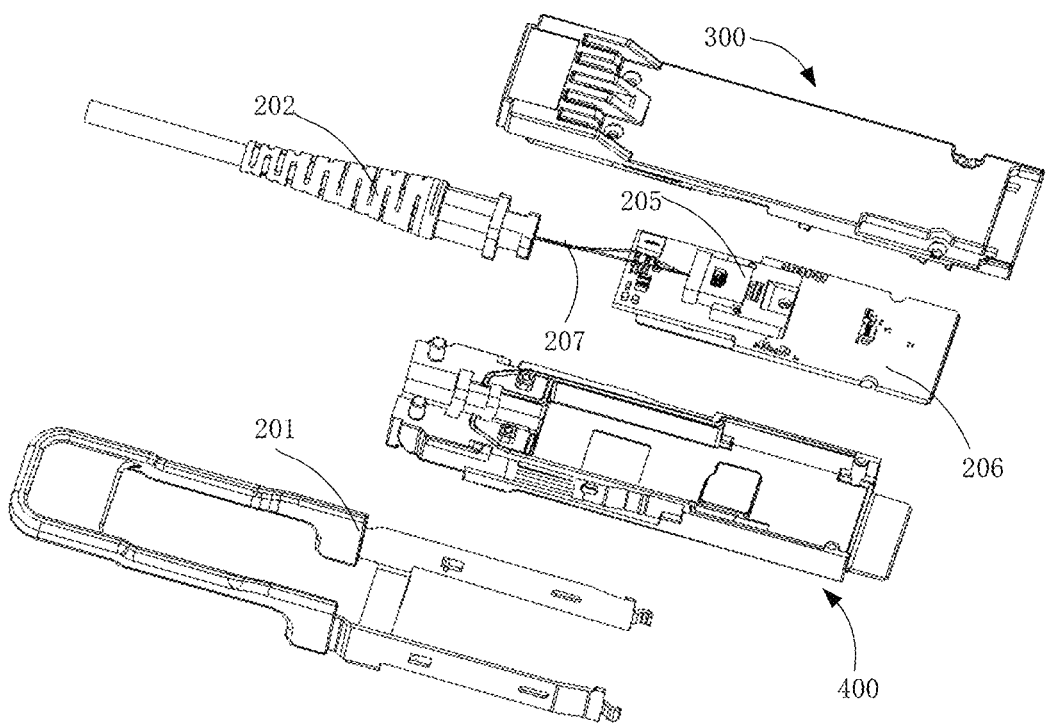
FIG. 4 is an exploded structural diagram of an optical module, in accordance with some embodiments.

FIG. 3 is a structural diagram of an optical module, in accordance with some embodiments. FIG. 4 is an exploded structural diagram of an optical module, in accordance with some embodiments. As shown in FIG. 3 and FIG. 4, the optical module 200 in this embodiment of the present disclosure includes a shell having an upper shell 300 and a lower shell 400, an unlock component 201, a circuit board 206, a transceiver optical submodule 205, an optical-fiber connector 202, and an optical fiber 207.

The upper shell 300 may cover the lower shell 400 to form a wrapping cavity with two openings. An outer contour of the wrapping cavity is typically square. In an embodiment of the present disclosure, the lower shell includes a bottom plate and two lower side plates located on both sides of the bottom plate and disposed perpendicular to the bottom plate. The upper shell includes a top plate and two upper side plates, and the top plate covers the two upper side plates of the upper shell to form the wrapping cavity. In some other embodiments, the upper shell 300 includes a top plate and two upper side plates located on both sides of the top plate and disposed perpendicular to the top plate; and the lower shell 400 includes a bottom plate and two lower side plates located on both sides of the bottom plate and disposed perpendicular to the bottom plate, and the two upper side plates are combined with the two lower side plates respectively to achieve that the upper shell 300 covers the lower shell 400.

The two openings may be openings 203 and 204 at two ends of the shell in a same direction, or may be two openings of the shell in different directions. The same direction refers to a direction in which a connection line between the openings 203 and 204 is located, which is consistent with a longitudinal direction of the optical module 200. The different directions mean that the direction in which the connection line between the openings 203 and 204 is located is inconsistent with the longitudinal direction of the optical module 200. For example, the opening 203 is located on an end face of the optical module 200 (a right end of FIG. 3), while the opening 204 is located on a side portion of the optical module 200 (a lower side of FIG. 3). One of the openings is an electrical port 203, through which a connecting finger of the circuit board extends into a master monitor such as an optical network terminal, and the other opening is an optical port 204, through which an external optical fiber may be accessed. The circuit board 300, the transceiver optical submodule 205, and other optoelectronic components are located in the wrapping cavity formed by the upper shell and lower shell.

By using an assembly mode of combining the upper shell 300 and the lower shell 400, it is possible to facilitate installation of the transceiver optical submodule 205 and the optical fiber 207 into the wrapping cavity, and the upper shell 300 and the lower shell 400 may form encapsulation protection for these devices. In addition, when assembling components such as the circuit board, the silicon optical chip and the laser assembly, it is possible to facilitate arrangement of positioning structures, heat dissipation structures and electromagnetic shielding structures of these components, and it is possible to facilitate implementation of automated production.

The unlock component 201 is located on an outer wall of the wrapping cavity/lower shell 400, and is configured to implement a fixed connection between the optical module and the master monitor, or release the fixed connection between the optical module and the master monitor.

The unlock component 201 has an engagement part that fits with the cage of the master monitor. A tail end of the unlock component may be pulled so that the unlock component moves relative to a surface of the outer wall. When the optical module is inserted into the cage of the master monitor, the optical module is fixed in the cage of the master monitor by the engagement part of the unlock component. The engagement part of the unlock component moves as the unlock component is pulled, which changes a connection relationship between the engagement part and the master monitor, to release an engagement relationship between the optical module and the master monitor, so that the optical module may be withdrawn from the cage of the master monitor.

The circuit board 206 is provided with circuit wiring, electronic elements (such as a capacitor, a resistor, a triode, and a MOS transistor), chips (such as an MCU, clock data recovery (CDR) and power management chips, a data processing chip DSP), and the like.

The circuit board 206 connects electrical components in the optical module through the circuit wiring according to a circuit design, to implement electrical functions such as power supplying, electrical signal transmission, and grounding.

The circuit board is generally a rigid circuit board. Due to its relatively hard material, the rigid circuit board can also implement a load-bearing function. For example, the rigid circuit board can carry a chip stably. When an optical transceiver component is located on the circuit board, the rigid circuit board can also carry the optical transceiver component stably. The rigid circuit board may be further inserted into the electrical connector in the cage of the master monitor. In an embodiment of the present disclosure, a metal pin/a connecting finger is formed on an end surface of the rigid circuit board for connection to the electrical connector. These functions cannot be implemented by a flexible circuit board.

Some optical modules may also use a flexible circuit board as a supplementation to the rigid circuit board. The flexible circuit board is generally used in conjunction with the rigid circuit board. For example, the flexible circuit board can be used to connect between the rigid circuit board and the optical transceiver component.

The transceiver optical submodule 205 may adopt a structure form such as TO(coaxial) package, COB (chip on plate) package, or the like. In FIG. 4, the transceiver optical submodule 205 is in structure form of the COB package. The transceiver optical submodule 205 is connected to the optical-fiber connector 202 through the optical fiber 207, and then connected to an external optical fiber through the optical-fiber connector 202.

In this embodiment of the present disclosure, for ease of fixing of the optical-fiber connector 202, an upper optical-port part of the upper shell 300 is provided with a first fixing groove, a lower optical-port part of the lower shell 400 is provided with a second fixing groove, and the optical-fiber connector 202 has one side fitting into the first fixing groove and the other side fitting into the second fixing groove. When the upper optical-port part and the lower optical-port part are fixed, the optical-fiber connector 202 is fixed in the first fixing groove and the second fixing groove to achieve a fixing purpose. A size of each aperture of the first fixing groove and the second fixing groove may directly depend on a size of a corresponding part of the optical-fiber connector 202.

Due to variability of the structure at the optical port of the optical module, an electromagnetic shielding effect at the optical port of the optical module is relatively weak. In an embodiment of the present disclosure, to improve the electromagnetic shielding effect of the optical module, a first shielding strip is disposed on a junction of the upper optical-port part and the lower optical-port part, and the first shielding strip is configured for electromagnetic shielding for the optical port of the optical module. In this embodiment of the present disclosure, the first shielding strip includes several shielding sub-strips. The several shielding sub-strips of the first shielding strip extend in multiple directions, to implement electromagnetic shielding of the first shielding strip at the optical port of the optical module in longitudinal, transverse, and other directions, and ensure the shielding effect of the first shielding strip at the optical port of the optical module.

In an embodiment of the present disclosure, the first shielding strip in this embodiment of the present disclosure may be formed by dispensing glue by a glue dispenser, and the glue may be conductive glue. In a manufacturing process of the optical module in this embodiment of the present disclosure, the glue may be dispensed on the lower shell 400 or the upper shell 300 by using the glue dispenser. Based on an example in which the glue is dispensed on the lower shell 400, this embodiment of the present disclosure is described in detail below.

Figure 5:
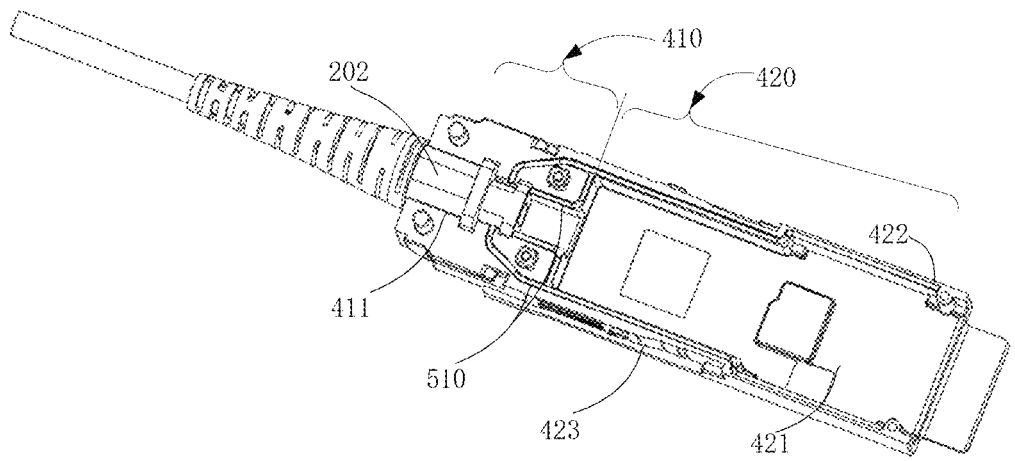
FIG. 5 is a structural diagram illustrating fitting between a lower shell and an optical fiber interface in accordance with some embodiments.

FIG. 5 is a structural diagram illustrating fitting between a lower shell and an optical fiber interface in accordance with some embodiments. As shown in FIG. 5, the lower shell 400 includes a lower optical-port part 410 for fixing the fiber connector 202 and a lower cavity part 420 for accommodating a component such as the circuit board 206.

The lower optical-port part 410 is provided with a second fixing groove 411, and the optical-fiber connector 202 is clamped in the second fixing groove 411. The lower optical-port part 410 is provided with a first shielding strip 510 extending in more than one direction. As shown in FIG. 5, the first shielding strip 510 includes several shielding sub-strips extending in multiple directions such as longitudinal, transverse, and oblique directions. The first shielding strip 510 is distributed on two sides of the second fixing groove 411.

In an embodiment of the present disclosure, the lower cavity part 420 includes a bottom plate 421 and a first lower side plate 422 and a second lower side plate 423 that are located on both sides of the bottom plate 421. A second shielding strip 520 is disposed on top of the first lower side plate 422, a third shielding strip 530 is disposed on top of the second lower side plate 423, where the second shielding strip 520 and the third shielding strip 530 are configured for electromagnetic shielding for the cavity of the optical module. The second shielding strip 520 and the third shielding strip 530 may also be formed by dispensing glue by a glue dispenser.

Figure 6:
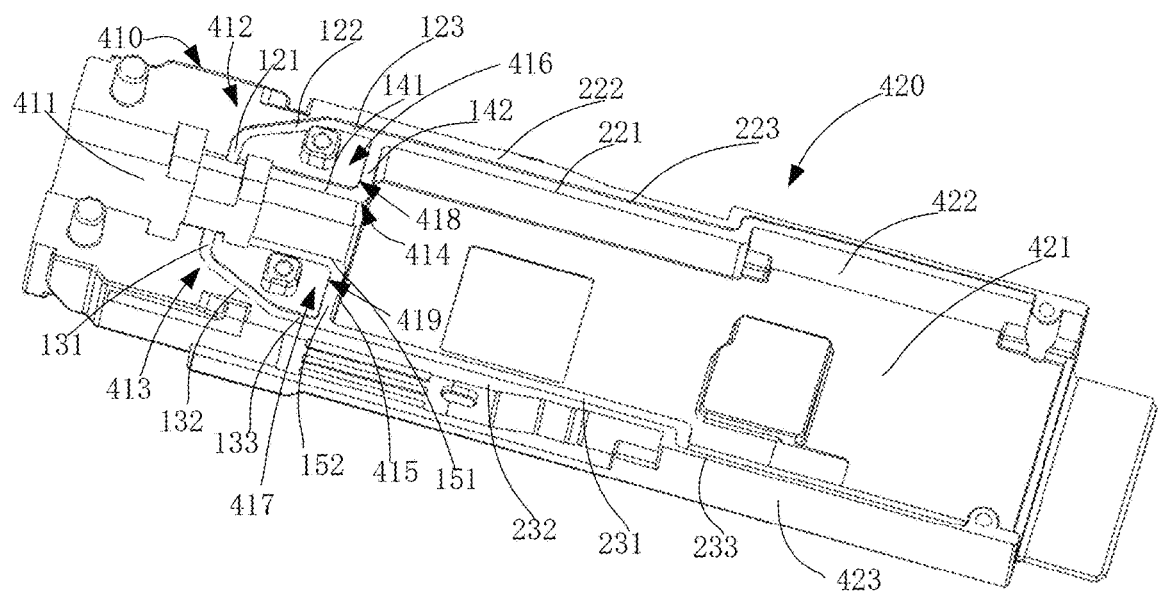
FIG. 6 is a structural diagram of a lower shell in accordance with some embodiments.
Figure 7:
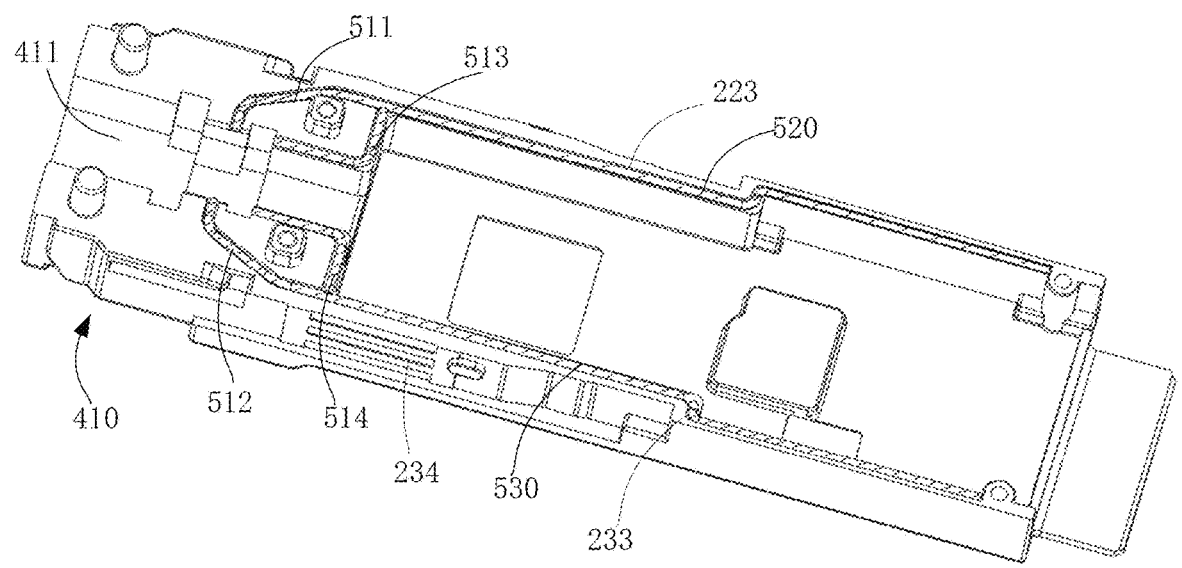
FIG. 7 is a structural diagram of a lower shell provided with a shielding strip in accordance with some embodiments.

FIG. 6 is a structural diagram of a lower shell in accordance with some embodiments. FIG. 7 is a structural diagram of a lower shell provided with a shielding strip according to an embodiment of the present disclosure. As shown in FIG. 6 and FIG. 7, the lower optical-port part 410 includes a first accommodation recess 412 and a second accommodation recess 413, and the first shielding strip 510 includes a first shielding sub-strip 511 disposed in the first accommodation recess 412 and a second shielding sub-strip 512 disposed in the second accommodation recess 413. The first accommodation recess 412 extends in longitudinal, transverse, and other directions of the lower optical-port part 410, so that the first shielding sub-strip 511 is disposed to extend in the longitudinal, transverse, and other directions of the lower optical-port part 410. The second accommodation recess 413 extends in longitudinal, transverse, and other directions of the lower optical-port part 410, so that the second shielding sub-strip 512 is disposed to extend in the longitudinal, transverse, and other directions of the lower optical-port part 410.

In this embodiment of the present disclosure, the first accommodation recess 412 at one end is in connection with the second fixing groove 411, and extends from an edge of the second fixing groove 411 to an edge of the lower optical-port part 410, and the second accommodation recess 413 at one end is in connection with the second fixing groove 411, and extends from an edge of the second fixing groove 411 to an edge of the lower optical-port part 410.

As shown in FIG. 6 and FIG. 7, the lower optical-port part 410 includes a first support plane 414 and a second support plane 415 on top thereof, and the first shielding strip 510 includes a third shielding sub-strip 513 disposed on the first support plane 414 and a fourth shielding sub-strip 514 disposed on the second support plane 415. In an embodiment of the present disclosure, the first support plane 414 and the second support plane 415 are disposed on an inner edge of the lower optical-port part 410, that is, the first support plane 414 and the second support plane 415 are disposed on an edge where the second fixing groove 411 or the lower optical-port part 410 is connected to an inner cavity of the lower cavity part 420. The first support plane 414 at one end is connected to the first accommodation recess 412, and the second support plane 415 at one end is connected to the second accommodation recess 413, so that the third shielding sub-strip 513 is connected to the first shielding sub-strip 511, and the fourth shielding sub-strip 514 is connected to the second shielding sub-strip 512. In an embodiment of the present disclosure, the first support plane 414 at one end is connected to a bottom plane of the first accommodation recess 412, and the second support plane 415 at one end is connected to a bottom plane of the second accommodation recess 413, so that the first shielding sub-strip 511 and the third shielding sub-strip 513, as well as the second shielding sub-strip 512 and the fourth shielding sub-strip 514, have a uniform height, to facilitate assembly production of the shielding strips and assembling of the upper shell 300 and the lower shell 400.

In an embodiment of the present disclosure, the first accommodation recess 412 includes a first straight section 121, a first transition section 122, and a second straight section 123 in series connection, and the first shielding sub-strip 511 extends along extension trends of the first straight section 121, the first transition section 122, and the second straight section 123, so that the first shielding sub-strip 511 extends in multiple directions. The first support plane 414 includes a third straight section 141 and a fourth straight section 142 in series connection, and the third shielding sub-strip 513 extends along extension trends of the third straight section 141 and the fourth straight section 142, so that the third shielding sub-strip 513 extends in multiple directions. The first straight section 121, the first transition section 122, the second straight section 123, the third straight section 141, and the fourth straight section 142 form, on top of the lower optical-port part 410, a structure of a pattern with multiple extension directions, so that the first shielding sub-strip 511 and the third shielding sub-strip 513 form a structure of a pattern with multiple extension directions, to implement electromagnetic shielding in multiple directions.

In an embodiment of the present disclosure, the first straight section 121 has an extension direction perpendicular to the edge of the second fixing groove 411, the second straight section 123 has an extension direction parallel to the longitudinal direction of the optical module, the first transition section 122 connects the first straight section 121 and the second straight section 123, and the first transition section 122 is configured to implement transition of the first accommodation recess 412 from the extension direction of the first straight section 121 to the extension direction of the second straight section 123. In this way, it may be achieved that the first shielding sub-strip 511 has multiple extension directions, and may be easily disposed.

In an embodiment of the present disclosure, the third straight section 141 has an extension direction parallel to an extension direction of the second fixing groove 411, and the fourth straight section 142 has an extension direction perpendicular to the extension direction of the second fixing groove 411, so that the third shielding sub-strip 513 can be easily disposed, while an electromagnetic shielding effect in the extension direction of the second fixing groove 411 and the extension direction perpendicular to the second fixing groove 411 may be improved.

In an embodiment of the present disclosure, the second accommodation recess 413 includes a fifth straight section 131, a second transition section 132, and a sixth straight section 133 in series connection, the second shielding sub-strip 512 extends along extension trends of the fifth straight section 131, the second transition section 132, and the sixth straight section 133, so that the second shielding sub-strip 512 extends in multiple directions. The second support plane 415 includes a seventh straight section 151 and an eighth straight section 152 in series connection, and the fourth shielding sub-strip 514 extends along extension trends of the seventh straight section 151 and the eighth straight section 152, so that the fourth shielding sub-strip 514 extends in multiple directions. The fifth straight section 131, the second transition section 132, the sixth straight section 133, the seventh straight section 151, and the eighth straight section 152 form, on top of the lower optical-port part 410, a structure of a pattern with multiple extension directions, so that the second shielding sub-strip 512 and the fourth shielding sub-strip 514 form a structure of a pattern with multiple extension directions, to implement electromagnetic shielding in multiple directions.

For a pattern formed by the fifth straight section 131, the second transition section 132, the sixth straight section 133, the seventh straight section 151, and the eighth straight section 152, reference may be made to the pattern formed by the first straight section 121, the first transition section 122, the second straight section 123, the third straight section 141, and the fourth straight section 142. In an embodiment of the present disclosure, the fifth straight section 131, the second transition section 132, the sixth straight section 133, the seventh straight section 151, and the eighth straight section 152 are disposed to symmetrical to the first straight section 121, the first transition section 122, the second straight section 123, the third straight section 141, and the fourth straight section 142 with regard to a central axis of the optical module.

In this embodiment of the present disclosure, the lower optical-port part 410 further includes a first top plane 416 and a second top plane 417 on top thereof. A first stepped plane 418 is formed between the first top plane 416 and the first support plane 414, and the first stepped plane 418 is configured to assist with positioning of the third shielding sub-strip 513. A second stepped plane 419 is formed between the second top plane 417 and the second support plane 415, and the second stepped plane 419 is configured to assist with positioning of the fourth shielding sub-strip 514. In an embodiment of the present disclosure, the first top plane 416 and the second top plane 417 are respectively provided with screw holes, and the lower shell 400 and the upper shell 300 are fixedly connected through the screw holes, which helps fully utilize space at the lower optical-port part 410. Correspondingly, the lower optical-port part 410 is further provided with a positioning hole or a positioning pin. For example, the lower optical-port part 410 is provided with a positioning pin, and correspondingly, the upper optical-port part is provided with a positioning hole, and the positioning pin fits into the positioning hole to implement assembly positioning of the upper shell 300 and the lower shell 400.

In some embodiments of the present disclosure, a third support plane 221 is disposed on top of the first lower side plate 422, the second shielding strip 520 is disposed on the third support plane 221, and the second shielding strip 520 is connected to the first shielding strip 510. In an embodiment of the present disclosure, the second shielding strip 520 at one end is connected to the first shielding sub-strip 511. In an embodiment of the present disclosure, the third support plane 221 at one end is connected to the bottom plane of the first accommodation recess 412, so that the first shielding strip 510 and the second shielding strip 520 have a uniform height, to facilitate assembly production of the shielding strips and assembling of the upper shell 300 and the lower shell 400.

In an embodiment of the present disclosure, a third top plane 222 is further disposed on top of the first lower side plate 422. A third stepped plane 223 is formed between the third top plane 222 and the third support plane 221, and the third stepped plane 223 is configured to assist with positioning of the second shielding strip 520.

In some embodiments of the present disclosure, a fourth support plane 231 is disposed on top of the second lower side plate 423, the third shielding strip 530 is disposed on the fourth support plane 231, and the third shielding strip 530 is connected to the first shielding strip 510. In an embodiment of the present disclosure, the third shielding strip 530 at one end is connected to the second shielding sub-strip 512. In an embodiment of the present disclosure, the fourth support plane 231 at one end is connected to the bottom plane of the second accommodation recess 413, so that the first shielding strip 510 and the third shielding strip 530 have a uniform height, to facilitate assembly production of the shielding strips and assembling of the upper shell 300 and the lower shell 400.

In this embodiment of the present disclosure, a fourth top plane 232 is further disposed on top of the second lower side plate 423. A fourth stepped plane 233 is formed between the fourth top plane 232 and the fourth support plane 231, and the fourth stepped plane 233 is configured to assist with positioning of the third shielding strip 530.

In this embodiment of the present disclosure, an outer wall of the first lower side plate 422 and an outer wall of the second lower side plate 423 respectively fit and are connected to the unlock component 201. In an embodiment of the present disclosure, the first lower side plate 422 and the second lower side plate 423 are respectively provided with several shielding bulges on the respective outer walls thereof. When the unlock component 201 is fitted onto the outer wall of the first lower side plate 422 and the outer wall of the second lower side plate 423, the unlock component 201 covers the shielding bulges on the outer wall of the first lower side plate 422 and the outer wall of the second lower side plate 423. In this way, when the optical module is inserted into the master monitor for use, sealing between the unlock component 201 and the lower shell 400 may be implemented by the shielding bulges, so that electromagnetic radiation transmitted to the shielding bulges from the master monitor is blocked, thereby improving an electromagnetic shielding effect for the master monitor by using the shielding bulges. The shielding bulges may be formed by convex structures on the outer walls of the first lower side plate 422 and the second lower side plate 423, or may be formed by pasting conductive cloth or a wave-absorbing material on the outer walls of the first lower side plate 422 and the second lower side plate 423.

As shown in FIG. 7, several first shielding bulges 234 are disposed on the outer wall of the second lower side plate 423. When electromagnetic radiation from the master monitor spreads along a gap between the unlock component 201 and the outer wall of the second lower side plate 423, the electromagnetic radiation is blocked by the first shielding bulges 234 to improve the electromagnetic shielding effect for the master monitor. The shielding bulges corresponding to the first shielding bulge 234 may be disposed on the outer wall of the first lower side plate 422.

Figure 8:
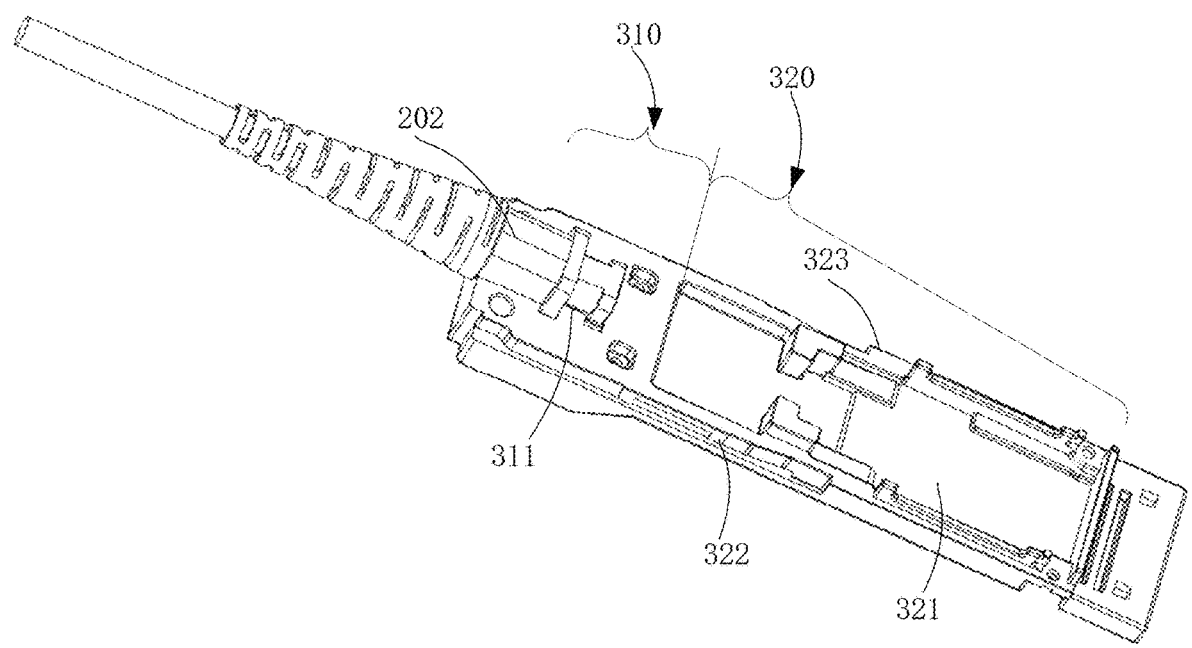
FIG. 8 is a structural diagram illustrating fitting between an upper shell and an optical fiber interface in accordance with some embodiments.
Figure 9:
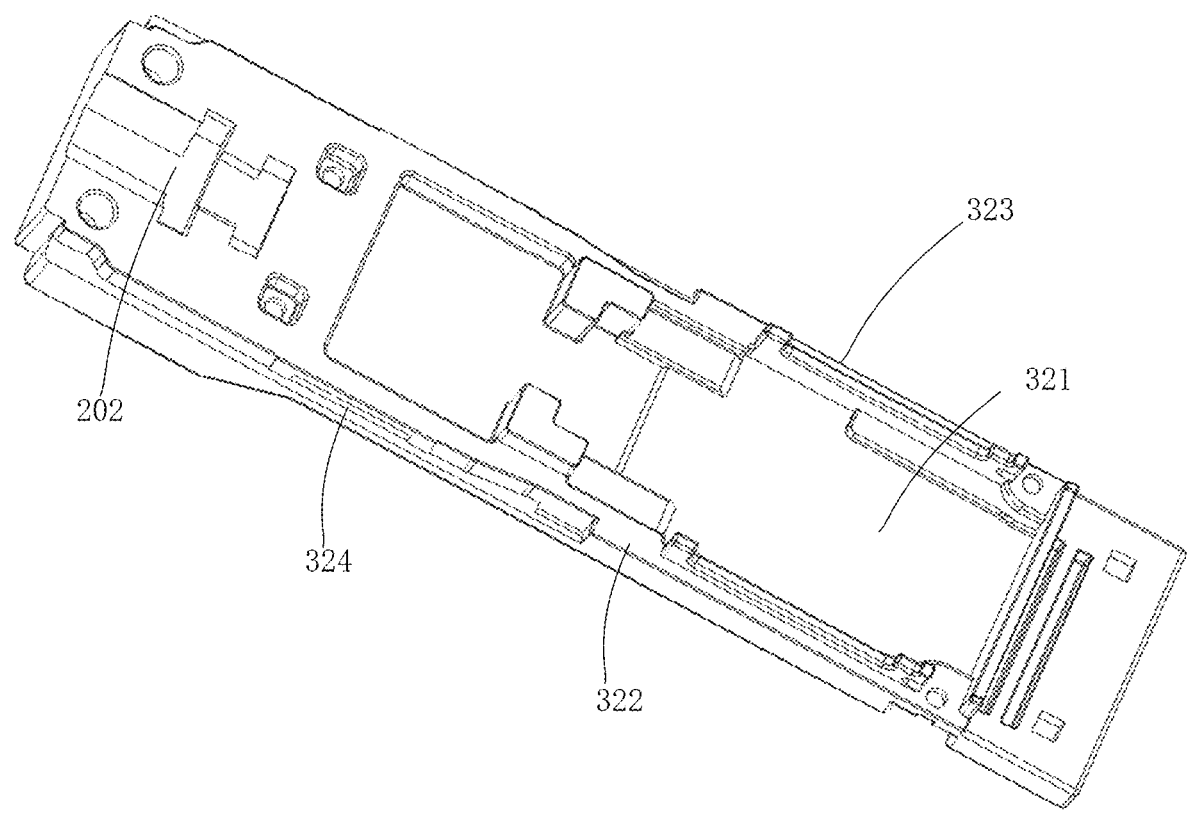
FIG. 9 is a structural diagram of an upper shell in accordance with some embodiments.

FIG. 8 is a structural diagram illustrating fitting between an upper shell and an optical fiber interface in accordance with some embodiments. FIG. 9 is a structural diagram of an upper shell in accordance with some embodiments. As shown in FIG. 8 and FIG. 9, the upper shell 300 includes an upper optical-port part 310 and an upper cavity part 320, where the upper optical-port part 310 may be in engagement with the lower optical-port part 410 for fixing of the optical-fiber connector 202, and the upper cavity part 320 covers the lower cavity part 420 to accommodate a component such as the circuit board 206. The upper optical-port part 310 is provided with a first fixing groove 311, and the optical-fiber connector 202 is clamped in the first fixing groove 311. Meanwhile, when the upper shell 300 covers the lower shell 400 to be fixed and assembled into being together, the top of the upper optical-port part 310 presses against the first shielding strip 510 disposed on the lower optical-port part 410, which helps to ensure an electromagnetic shielding effect of the first shielding strip 510 in an embodiment of the present disclosure.

As shown in FIG. 8 and FIG. 9, the upper cavity part 320 includes a top plate 321 and a first upper side plate 322 and a second upper side plate 323 that are located on both sides of the top plate 321. When the upper shell 300 covers the lower shell 400 to be fixed and assembled into being together, the first upper side plate 322 fits and is connected to the first lower side plate 422, and the second upper side plate 323 fits and is connected to the second lower side plate 423, so that the top of the first upper side plate 322 presses against the second shielding strip 520 disposed on the first lower side plate 422, and the top of the second upper side plate 323 presses against the third shielding strip 530 disposed on the second lower side plate 423, which helps to ensure electromagnetic shielding effects of the second shielding strip 520 and the third shielding strip 530 in an embodiment of the present disclosure.

In this embodiment of the present disclosure, an outer wall of the first upper side plate 322 and an outer wall of the second upper side plate 323 respectively fit and are connected to the unlock component 201. The first upper side plate 322 and the second upper side plate 323 are respectively provided with shielding bulges on the respective outer walls thereof. When the unlock component 201 is fitted onto the outer wall of the first upper side plate 322 and the outer wall of the second upper side plate 323, the unlock component 201 covers the shielding bulges on the outer wall of the first upper side plate 322 and the outer wall of the second upper side plate 323, so that when the optical module is inserted into the master monitor for use, sealing between the unlock component 201 and the upper shell 300 is implemented by the shielding bulges, and electromagnetic radiation transmitted to the shielding bulges from the master monitor is blocked, thereby improving an electromagnetic shielding effect for the master monitor by using the shielding bulges in an embodiment of the present disclosure. The shielding bulges on the outer wall of the first upper side plate 322 and the outer wall of the second upper side plate 323 may be formed by convex structures on the outer walls of the first upper side plate 322 and the second upper side plate 323, or may be formed by pasting conductive cloth or a wave-absorbing material on the outer walls of the first upper side plate 322 and the second upper side plate 323.

As shown in FIG. 9, several second shielding bulges 324 are disposed on the outer wall of the second upper side plate 322. When electromagnetic radiation from the master monitor spreads along a gap between the unlock component 201 and the outer wall of the first upper side plate 322, the electromagnetic radiation is blocked by the second shielding bulges 324 to improve the electromagnetic shielding effect for the master monitor. The shielding bulges corresponding to the second shielding bulge 324 may be disposed on the outer wall of the second upper side plate 323.

Figure 10:
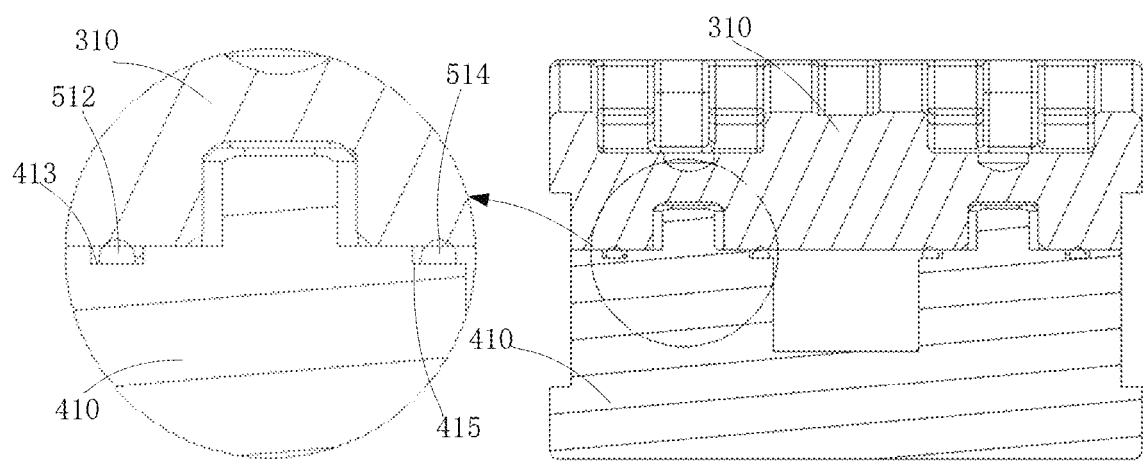
FIG. 10 is a first cross-sectional view of an optical module in accordance with some embodiments.

FIG. 10 is a first cross-sectional view of an optical module in accordance with some embodiments. A cross section in FIG. 10 is taken from the optical port of the optical module, and FIG. 10 shows an assembly structure of the upper shell 300 and the lower shell 400 at the optical port. As shown in FIG. 10, the second shielding sub-strip 512 is disposed in the second accommodation recess 413, the fourth shielding sub-strip 514 is disposed on the second support plane 415, and the upper shell 300 and the lower shell 400 fit and press against the second shielding sub-strip 512 and the fourth shielding sub-strip 514, to implement electromagnetic shielding between the upper shell 300 and the lower shell 400 at the optical port.

Figure 11:
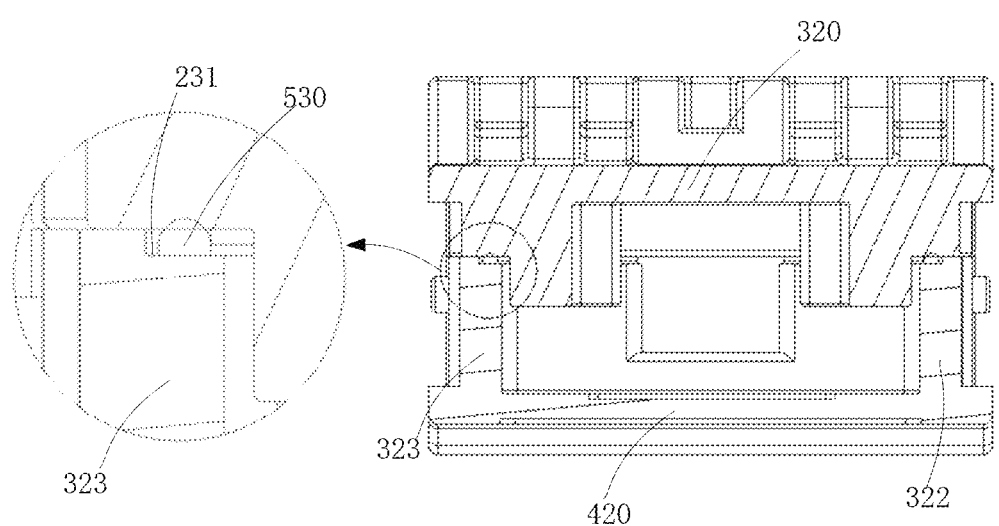
FIG. 11 is a second cross-sectional view of an optical module in accordance with some embodiments.

FIG. 11 is a second cross-sectional view of an optical module in accordance with some embodiments. A cross section in FIG. 11 is taken from the inner cavity of the optical module, and FIG. 11 shows an assembly structure of the upper shell 300 and the lower shell 400 at the inner cavity. As shown in FIG. 11, the third shielding strip 530 is disposed on the second lower side plate 423, and the upper shell 300 and the lower shell 400 fit and press against the third shielding strip 530. Similarly, the second shielding strip 520 is disposed on the first lower side plate 422, and the upper shell 300 and the lower shell 400 fit and press against the second shielding strip 520, to implement electromagnetic shielding between the upper shell 300 and the lower shell 400 at the inner cavity.

In some embodiments of the present disclosure, the shielding strips may be disposed on the upper shell 300. For a specific form of disposing the shielding strips, reference may be made to that of disposing the shielding strips on the lower shell 400.

Finally, it should be noted that, the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. An optical module, comprising:
an upper shell comprising an upper optical-port part, wherein a first fixing groove is disposed on top of the upper optical-port part;
a lower shell comprising a lower optical-port part, wherein the lower optical-port part fits and is connected to the upper optical-port part, and a second fixing groove is disposed on top of the lower optical-port part; and
an optical-fiber connector, by one side thereof clamped in the first fixing groove and by the other side thereof clamped in the second fixing groove;
wherein a first shielding strip is disposed on a junction of the upper optical-port part and the lower optical-port part, and extends in multiple directions;
wherein the upper shell further comprises an upper cavity part comprising a top plate and a first upper side plate and a second upper side plate that are located on both sides of the top plate; the lower shell further comprises a lower cavity part comprising a bottom plate and a first lower side plate and a second lower side plate that are located on both sides of the bottom plate; and the first upper side plate fits and is connected to the first lower side plate, and the second upper side plate fits and is connected to the second lower side plate;
wherein the first upper side plate, the second upper side plate, the first lower side plate, and the second lower side plate are respectively provided with shielding bulges on the respective outer walls thereof, and an unlock component covers the shielding bulges.

2. The optical module according to claim 1, wherein the first shielding strip comprises a first shielding sub-strip and a second shielding sub-strip; and
a first accommodation recess and a second accommodation recess are disposed on top of the lower optical-port part, and the first accommodation recess and the second accommodation recess each have one end in connection with the first fixing groove; and the first shielding sub-strip is disposed in the first accommodation recess, the second shielding sub-strip is disposed in the second accommodation recess, and the first shielding sub-strip and the second shielding sub-strip each have one end which is in contact with side surfaces of the optical-fiber connector.

3. The optical module according to claim 2, wherein the first shielding strip further comprises a third shielding sub-strip and a fourth shielding sub-strip;
a first support plane and a second support plane are disposed on the top and on an inner edge of the lower optical-port part, one end of the first support plane is connected to a bottom plane of the first accommodation recess, and one end of the second support plane is connected to a bottom plane of the second accommodation recess; and
the third shielding sub-strip is disposed on the first support plane, the fourth shielding sub-strip is disposed on the second support plane, the third shielding sub-strip has one end connected to the first shielding sub-strip and the other end in contact with an end face of the optical-fiber connector, and the fourth shielding sub-strip has one end connected to the second shielding sub-strip and the other end in contact with the end face of the optical-fiber connector.

4. The optical module according to claim 1, wherein
the first lower side plate comprises a third support plane on top thereof, and the second lower side plate comprises a fourth support plane on top thereof; and
a second shielding strip is disposed on the third support plane, a third shielding strip is disposed on the fourth support plane, and the second shielding strip and the third shielding strip are connected to the first shielding strip, respectively.

5. The optical module according to claim 3, wherein the first accommodation recess comprises a first straight section, a first transition section, and a second straight section in series connection, the first straight section has an extension direction perpendicular to an edge of the first fixing groove, and the second straight section has a tail end in connection with the first support plane; and the first shielding sub-strip has an extension direction varying with an extension direction of the first accommodation recess.

6. The optical module according to claim 3, wherein the first support plane comprises a third straight section and a fourth straight section in series connection, the third straight section has an extension direction parallel to an edge of the first fixing groove, and the fourth straight section has an extension direction perpendicular to the edge of the first fixing groove; and the third shielding sub-strip has an extension direction varying with an extension direction of the first support plane.

7. The optical module according to claim 3, wherein the lower optical-port part comprises a first top plane and a second top plane on top thereof, wherein a first stepped plane is formed between the first top plane and the first support plane, and a second stepped plane is formed between the second top plane and the second support plane.

8. The optical module according to claim 4, wherein the first lower side plate comprises a third support plane on top thereof, and a third stepped plane is formed between the third top plane and the third support plane; and
the second lower side plate comprises a fourth support plane on top thereof, and a fourth stepped plane is formed between the fourth top plane and the fourth support plane.

9. The optical module according to claim 7, wherein screw holes for bolt connection with the upper shell are provided on the first top plane and the second top plane, respectively; and
the upper optical-port part further comprises a positioning hole, the lower optical-port part further comprises a positioning pin, wherein the positioning pin fits into the positioning hole.

\* \* \* \* \*